Patented Feb. 21, 1950

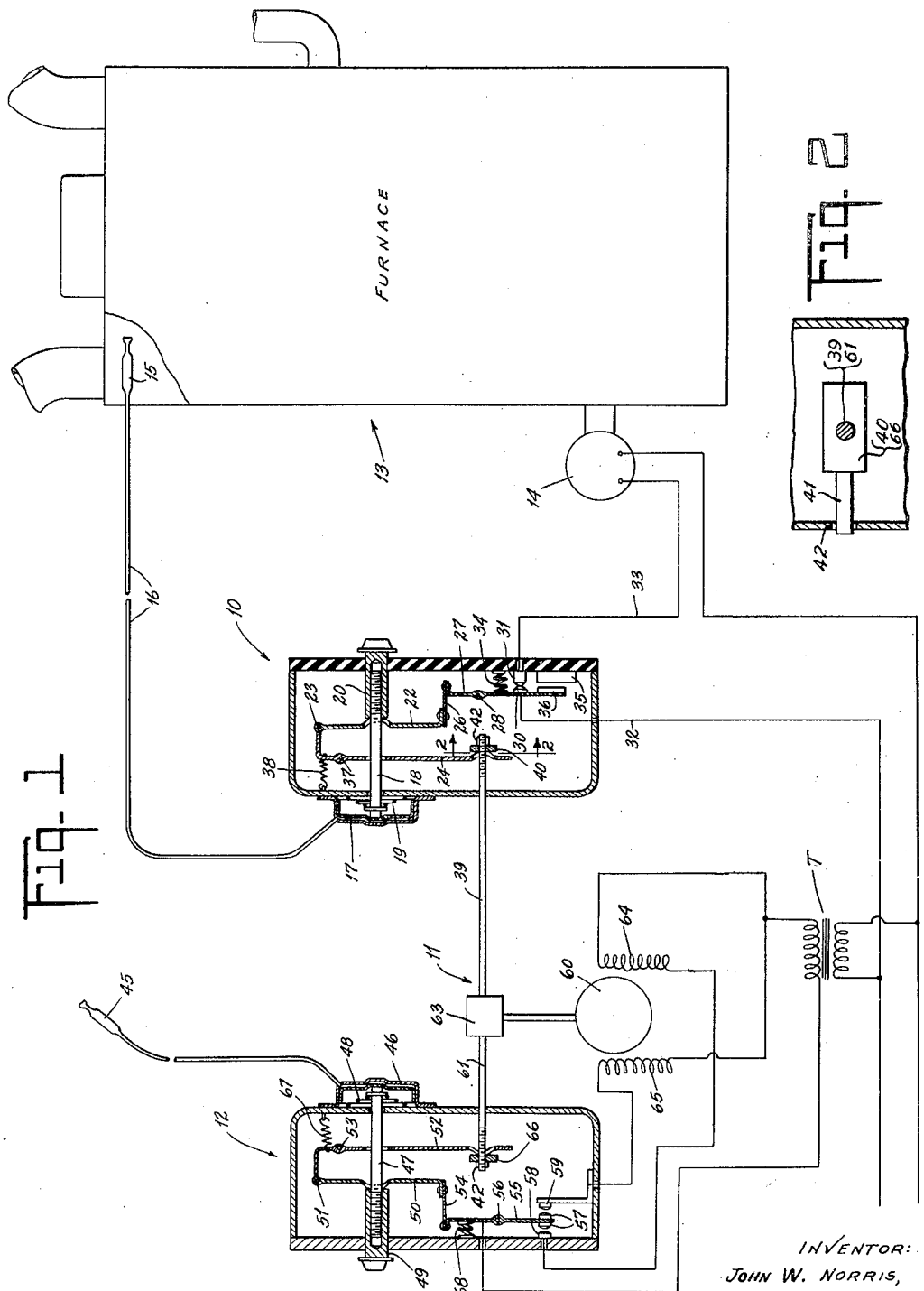

2,498,571

UNITED STATES PATENT OFFICE 2,498,571

SPACE TEMPERATURE CONTROL

John W. Norris, Marshalltown, Iowa, assignor, by mesne assignments, to Missouri Automatic Control Corporation, a corporation of Missouri Application April 1, 1944, Serial No. 529,102

2 Claims. (Cl. 236—9)

The present invention relates to a space temperature control. More particularly, the invention comprises an apparatus and method for modifying the limiting temperature of operation of a heat-change device in response to the temperature of a space being influenced by the heat-change device.

A broad object of the invention is to provide modulated operation of a burner wherein the burner always operates at maximum efficiency.

An object of the invention is to provide a method of control of a heat-change device wherein one limiting temperature of operation thereof is varied in accordance with the demand for heat change in the space, the temperature of which is being controlled.

Specifically, it is an object of the invention to provide a method of, and system for, temperature control of a space, wherein the maximum or limit temperature permitted at the furnace is increased with increase in heat demand in the space, and decreased with decrease in heat demand at the space.

Specifically, it is an object to provide a control mechanism in which a room thermostat operates a follow-up mechanism, together with a limit switch at the burner, and connections between the limit switch and the follow-up mechanism to vary the operating temperature of the limit switch in response to the position of the follow-up mechanism.

A further object of the invention is to provide a continual cycling operation of a burner operating at maximum efficiency during heat-generating parts of the cycle to heat a heat-conveying medium, and to govern the cycling operation by varying the temperature imparted to the medium during the heat-generating part of the cycle, in accordance with the heat demands of the space being heated.

A further object is to provide a continual cycling operation of a burner to maintain a heat-conveying medium substantially within a band with upper and lower temperature limits, and varying the temperature band in accordance with the heat demands of the space being heated.

Fig. 1 shows a typical diagram of the mechanism; and

Fig. 2 shows a section on the line 2—2 of Fig. 1.

In the drawing a thermostatic limit switch is generally shown at 10, a follow-up mechanism is shown at 11, a space or room thermostat is generally shown at 12, and a furnace is generally shown at 13. The furnace has some form of electrically operated device 14 for supplying at least one combustion ingredient thereto.

The mechanism includes a main limit switch 10 having a bulb 15 disposed at some suitable point, such as the furnace bonnet, where it will respond to the temperature of the medium being heated by the furnace, here shown as hot air. The bulb 15 is connected through a suitable line, such as a capillary 16, to an expansible chamber 17, here of the diaphragm cup type, the inner bottom wall of which is adapted to be displaced by increase in the volume of the liquid within the bulb, capillary and chamber. Preferably, this is a solid-charge system.

The thermal element 17 operates to displace a stud 18, normally held against the expansible wall by a coil spring 19. The stud 18 is threaded at its opposite end to receive an adjustable collar or sleeve 20, which sleeve is moved in and out in accordance with the movements of the stud.

The switch mechanism includes a primary lever 22, pivoted at 23 to a follow-up lever 24. The pivot 23 constitutes a normal operating pivot about which the primary lever moves. The primary lever straddles the stud 18 and has portions thereon engaging the sleeve 20 so that it may follow the movements of the sleeve and the stud 18. The end of the primary lever 22 opposite the pivot 23 is connected by a flexible leaf spring element 26 to a switch lever 27 fixedly pivoted at 28. The spring 26 transmits the displacing force from the primary lever 22 to the switch lever 27, and, at the same time, accommodates for the slight relative displacements of the connected ends of the two levers caused by their movement about separated pivot points. The switch lever 27 has a contact 30 that may engage with a contact 31 to close the lines 32 and 33 to start the furnace motor 14. The switch lever 27 is normally maintained in a maximum clockwise position by a spring 34. It is, however, urged into contact-closing position with a snap-action by the magnet 35 that acts upon an armature 36 on the switch. This arrangement provides a differential between opening and closing temperatures, as is well known. In this switch, a representative differential may be 25°.

The follow-up lever 24 is pivoted at 37 to the housing, and is normally urged in the maximum counterclockwise direction by a spring 38. The free end of the follow-up lever 24 straddles a motor driven shaft 39 and engages against a nut 40, threaded on to the shaft 39, but prevented from rotation by suitable engagement with the switch housing. This engagement may be by a pin 41 engaging in a slot 42 in the housing 12, as shown in Fig. 2, the slot extending parallel to the shaft 39. Rotation of the shaft 39 thus causes axial displacement of the nut 40.

This follow-up switch corresponds in essential structure to the follow-up switch shown in greater detail in Patent No. 2,395,604 to John O. Yeida granted on February 26, 1946.

The space or room thermostat mechanism 12 is of the same construction as the limit switch, but possessing a double throw switch, of the walking type.

The room thermostat 12 comprises a temperature responsive device 45, here shown as a bulb and tube system filled with liquid. The expansion and contraction of the liquid in response to temperature changes cause movement of a diaphragm 46. This diaphragm displaces a stud 47 normally urged against it by a spring 48. The stud has a collar 49 adjustably threaded thereon.

A primary lever 50 straddles the stud 47 and engages the collar 49 thereon. This primary lever 50 is pivoted at 51 onto an end of a follow-up lever 52 that is fixedly pivoted at 53, and which straddles the stud 47, extending beyond it for a purpose to be described.

The other end of the primary lever 50 is pivoted at 54 to a switch lever 55, which, in turn, is fixedly pivoted at 56. Its other end has a double contact 57 selectively engageable with either a fixed contact 58 or a fixed contact 59.

The follow-up mechanism 11 includes a motor 60 driving the shaft 39 and a similar shaft 61, the motor operating through gearing 63. The motor has a forward winding 64 in series with the switch contact 58, across the secondary of the transformer T, and a reverse winding 65 in series with the switch contact 59 across said secondary.

The shaft 61 carries a nut 66 that is axially movable along the shaft, but held against rotation, in the same manner as the nut 40 is held. This nut engages the depending end of the follow-up lever 52.

A spring 67 draws the lever 52 clockwise about its pivot 53, to urge its lower end against the nut 66, at the same time displacing its upper end, with the pivot 51 of the primary lever, to the right in the drawing.

A compression spring 68 acts to urge the switch lever counterclockwise about its pivot 56, its movement in this direction being constrained by the pivot 54. The result is that the lower end of the primary lever 50 is normally urged leftward, to keep it against the collar 49.

The foregoing is illustrated as a follow-up mechanism that may desirably be used in the present system. However, there are many follow-up systems that may be used with advantage in this connection, such as the well-known ones operated mechanically, electrically, hydraulically, or pneumatically.

Operation

It will be seen that the limit switch 10 normally operates to open or close the contacts 30 and 31 in accordance with temperature variations in the furnace as reflected by the bulb 15. In the drawing, the contacts 30 and 31 are closed. As the temperature increases on the bulb, the liquid expands and displaces the stud 18 to the right in the drawing. The primary lever 22 then pivots about the pivot 23 to follow the movement of the stud 18 and the sleeve 20, it being urged to do so by the spring 34 which acts indirectly thereon through the switch lever 27. Such movement of the primary lever 22 pivots the switch lever 27 to open the contacts 30 and 31. Likewise, cooling at the bulb 15 contracts the thermal device 17, so that the stud 18 moves to the left, and the sleeve moving therewith acts directly upon the primary lever 22 to pivot the same about its pivot 23, and, in turn, to cause the switch lever 27 to swing about its pivot to close the contacts 30 and 31.

Furthermore, it will be seen that the position of the pivot 23 can be shifted to operate the switch. The pivot 23 is supported upon the follow-up lever 24, and this lever is positioned by the shaft 39 which displaces the nut 40 to the left or to the right in the drawing. If it be assumed that the contacts 30 and 31 are closed, as shown, and the shaft 39 turns to displace the nut 40 to the right, the follow-up lever 24 will be caused by its coil spring 38 to pivot counterclockwise so that its end follows the movement of the nut 40. Such movement of the follow-up lever 24 shifts the pivot 23 to the left. This causes the primary lever to pivot about its engagement with the sleeve 20 in a counterclockwise direction, which displaces the spring 26 to the right. This, correspondingly, causes the switch lever 27 to pivot clockwise to open the contacts.

It will be seen thus that, while a given temperature of the bulb 15 may close the contacts for one position of the shaft 39 and the nut 40, the same temperature will not cause the contacts to close when the shaft 39 moves the nut 40 to the right. Conversely, although at a given temperature of the bulb 15 the contacts are open for a given position of the nut 40, shifting of the shaft 39 to displace the nut 40 to the left will cause the contacts 30 and 31 to close at that particular temperature of the bulb. They will not open until the bulb has attained a higher temperature or the nut 40 has moved again toward the right.

It is apparent that the limit switch operation may be adjusted by turning the collar 26. As heretofore predicted, the shaft 39 is caused to assume particular positions in response to operation of the room thermostat 12.

The room thermostat will normally be adjusted to operate within a relatively narrow range at approximately 70°. Such adjustment may be primarily accomplished, and varied, by turning the collar 49 to a new location along the stud 47.

When the temperature conditions of the space are satisfactory, the switch blade 55 will hold the contact 57 away from both contacts 58 and 59. When the space demands heat, the diaphragm 46 will contract to the right. The stud 47 will follow under influence of the spring 48, and the collar 49 will cause the primary lever to pivot counterclockwise about its pivot 51 on the follow-up lever. This will displace the switch lever 55 to close the contacts 57 and 58, putting the forward winding of the motor in circuit.

The motor will start in a forward direction, moving the nut 66 leftward, so that the follow-up lever, under influence of the spring 67, pivots clockwise about its pivot 53, and displaces the pivot 51 on the primary lever 50 to the right. This last rocks the primary lever about its engagement with the collar 49 in a clockwise direction, producing counterclockwise movement of the switch lever 55 to separate the contact 57 from the contact 58. This stops the motor in a new position that is an index of the temperature of the bulb 45.

The action upon heating of the bulb is just the reverse. It causes the motor to reverse until the shafts assume a position corresponding to the temperature of the bulb 45.

It is apparent from the foregoing that the shaft 39 is moved under influence of the room thermostat to cause the nut 40 to take a position that corresponds with the temperature at the bulb 45. If the latter temperature decreases, the nut 40 will be moved to the left, producing a diplacement of the pivot 23 to the right, and increasing the temperature required to be attained at the bulb 15 before it will open the switch and cut off the furnace motor 14. If the room temperature increases, the nut 40 is moved to the right, decreasing the temperature at which the limit switch operates.

Cycling Operation

Assuming some condition of stable operation in which the furnace delivers enough heat to balance the heat losses from the room, the room thermostat 12 will maintain its contact 57 between the contacts 58 and 59, and the furnace motor 14 will cycle intermittently under control of the bulb 15 and the limit switch 10. This latter operation involves the closing of the contacts 30 and 31 of the limit switch 10 whenever the temperature at the bulb 15 is below the lower operating temperature of the limit switch, and the continued operation of the burner motor 14 until the temperature at the bulb 15 increases to the higher operating temperature of the limit switch. The difference between these two operating temperatures represents the predetermined differential of the limit switch. The particular values of these operating temperatures are, assuming an initial calibration by the sleeve 20, determined by the position of the nut 40; and the nut 40 is in turn positioned as a function of the particular temperature at the bulb 15 of the room thermostat 12.

Thus, for the particular temperature at the bulb 45, the limit switch 10 will provide intermittent cycling of the furnace motor 14, so that the heat conveying medium is heated only to particular maximum temperature, and then allowed to cool to a lower temperature.

Should the heat losses within the room exceed the amount of heat delivered by a particular setting of the limit switch 10, the temperature at the bulb 45 will decrease. When it decreases to a value below that necessary to cause closing of the contacts 57 and 58, these contacts will close and establish a circuit for the forward winding 64 of the motor 50. Forward operation of the motor will move the nuts 66 and 40 to the left. After predetermined movement of the nut 66, the contact 57 will again move to its intermediate position between the contacts 58 and 59, and the motor will stop. During this period of motor operation, the nut 40 will have moved to the left a sufficient distance to raise the limiting temperature of operation of the limit switch 10, so that the temperature at the bulb 15 will have to become higher than before in order to break the contacts 30 and 31 and stop the furnace motor 14.

Thereafter, the furnace motor 14 will continue to cycle under control of the bulb 15, but it will do so at higher temperature values, so as to supply the additional amount of heat for the room that is required to overcome the additional heat losses therefrom.

It will be obvious that where the heat supply is greater than that required to balance the heat losses from the room, the heating of the bulb 45 will close the contacts 57 and 59 to energize the reverse winding 65 of the motor 50, and move the nuts 66 and 40 a predetermined distance to the right. This will lower the operating temperature of the limit switch 10, and, consequently, lower the amount of heat delivered to the room.

The present control allows the furnace burner to operate at a predetermined rate of fuel combustion, so that it operates at maximum efficiency for the particular installation. At the same time, however, the actual heat delivered is made a function of the heat losses within the room, and the furnace follows the trend of heat changes within the room in the manner of modulation, by raising or lowering the band of temperatures in accordance with changes in temperature of the room.

It is apparent that, if the temperature of the room reaches a very high value, the operating temperature of the limit switch 10 will be reduced to a very low value which, for practical purposes, may be made to comprise an actual cut-off. Normally, however, there is no final cut-off of the furnace motor 14. This motor normally cycles on and off continually.

If desired, limit switches may be provided in the motor winding circuits in the manner well known in the art to prevent complete overrun of the motor and damaging of the parts.

It is evident that variations in the particular mechanisms may be made within the scope of this invention. It is obviously not restricted to bulb type thermostats or to the particular type of follow-up devices, although the ones shown cooperate together in an especially desirable manner. Also the system may be used in connection with refrigeration as well as with heating, although its most extensive field presently contemplated is in connection with hot air, hot water, or steam heating systems.

What is claimed is:

1. In combination, a limit switch mechanism having a switch and means to open and close the same in response to temperature conditions of a medium to which the mechanism is subjected, a thermostatic switch having contacts operable from a first to a second position relative to each other in response to temperature conditions of a space to which said medium is directed, means to adjust the temperatures at which said limit switch opens and closes, operating mechanism actuated by operation of the thermostat into second position, to operate the adjusting means, said last named mechanism being rendered inoperative by return of the thermostat to first position, whereby the limit switch is adjusted and left in adjusted position, and means in said operating mechanism to return the thermostatic switch contacts to first position after a predetermined adjustment of the limit switch.

2. A mechanism for use with a heating device for heating a medium to be delivered to heat a space, including a first thermostat responsive to the temperature of the medium and having a switch to control operation of the heating device in accordance with the temperature of the medium, a second thermostat for disposition in the space having hot and cold contacts and a main contact for selective contact with the hot and cold contacts and for disconnection from both in neutral position, the second thermostat being adapted to cause engagement of the main and hot contacts when the space is too hot, engagement of the main and cold contacts when the space is too cold, and to disconnect the contacts into neutral position when the space is satisfied, means to adjust the temperature of operation of the first thermostat up and down, mechanism to operate said means to adjust said temperature down when the second thermostat closes the main and hot contacts, and to adjust said temperature up when the second thermostat closes the main and cold contacts, said mechanism for operating the adjusting means also having connections to return the second thermostat contacts to relative positions of disconnection after predetermined adjustment of the first thermostat.

JOHN W. NORRIS.

REFERENCES CITED

The following references are of record in the file of this patent:

UNITED STATES PATENTS

| Number | Name | Date |
|---|---|---|
| 1,886,439 | Wells | Nov. 8, 1932 |
| 1,973,620 | Gille | Sept. 11, 1934 |
| 2,151,222 | Millard | Mar. 21, 1939 |
| 2,189,381 | McGrath | Feb. 6, 1940 |
| 2,189,382 | McGrath | Feb. 6, 1940 |
| 2,209,926 | McGrath | July 30, 1940 |
| 2,244,555 | Harris | June 3, 1941 |
| 2,272,188 | Danielson | Feb. 10, 1942 |
| 2,324,736 | Spence | July 20, 1943 |